Sept. 30, 1958 A. GUSSONI 2,853,736
MACHINE FOR THE MANUFACTURE OF BOTTLES FROM PLASTIC MATERIAL
Filed Jan. 9, 1956 5 Sheets-Sheet 1

INVENTOR.
ANGELO GUSSONI
ATTORNEY.

Sept. 30, 1958 A. GUSSONI 2,853,736
MACHINE FOR THE MANUFACTURE OF BOTTLES FROM PLASTIC MATERIAL
Filed Jan. 9, 1956 5 Sheets-Sheet 2
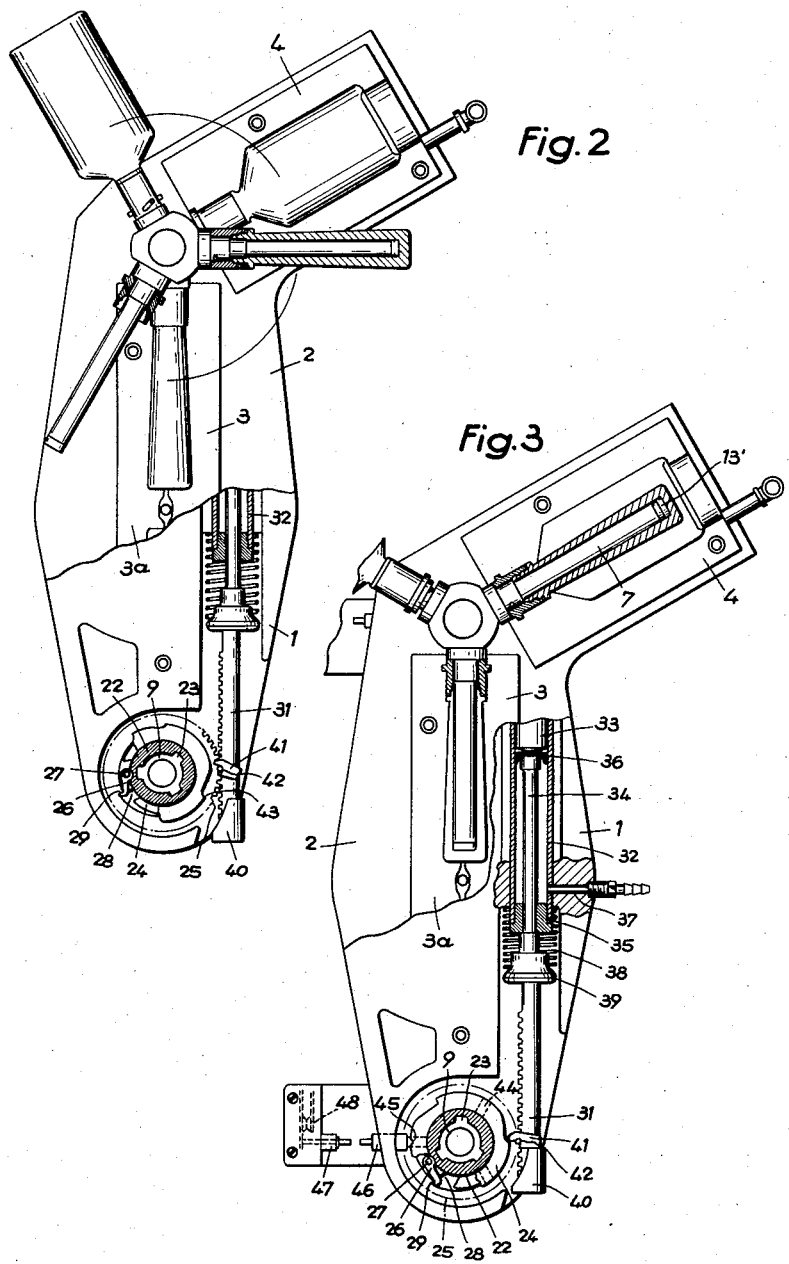
INVENTOR
ANGELO GUSSONI
ATTORNEY.

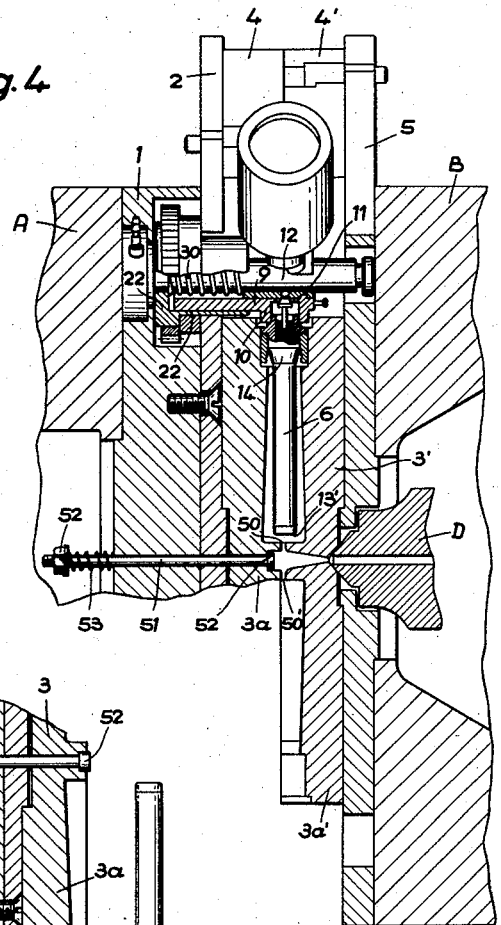

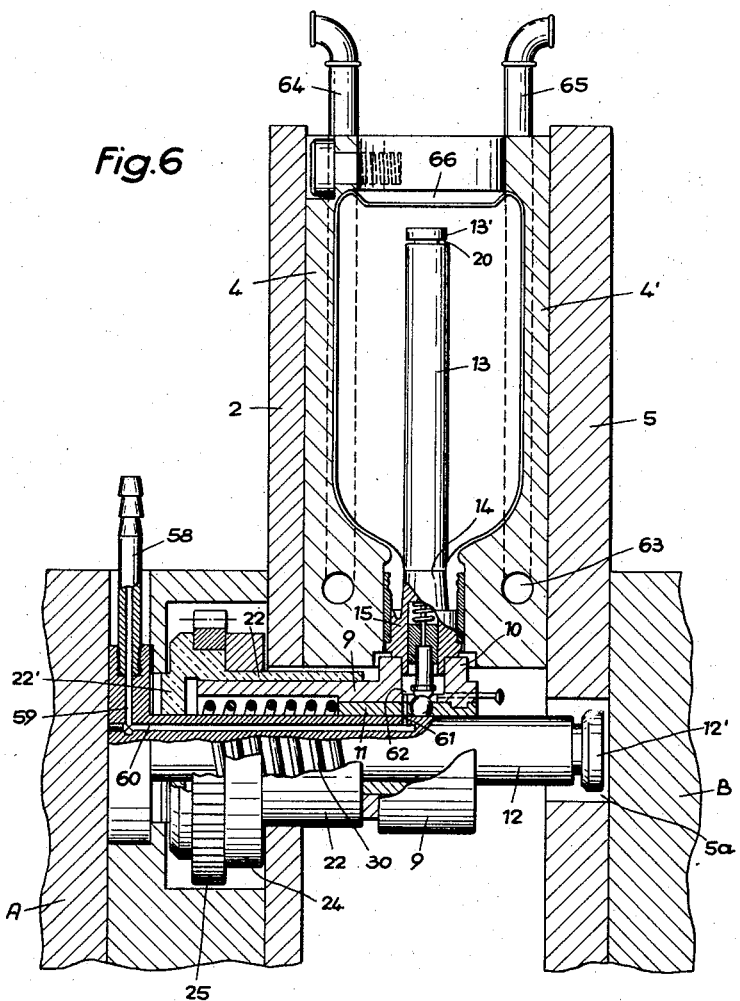

Sept. 30, 1958 A. GUSSONI 2,853,736
MACHINE FOR THE MANUFACTURE OF BOTTLES FROM PLASTIC MATERIAL
Filed Jan. 9, 1956 5 Sheets-Sheet 5

INVENTOR
ANGELO GUSSONI
ATTORNEY

United States Patent Office 2,853,736
Patented Sept. 30, 1958

2,853,736

MACHINE FOR THE MANUFACTURE OF BOTTLES FROM PLASTIC MATERIAL

Angelo Gussoni, Milan, Italy, assignor to Samuel Dubiner, Ramat Gan, Israel

Application January 9, 1956, Serial No. 561,381

2 Claims. (Cl. 18—5)

This invention relates to the manufacture of bottles from thermoplastic material by a sequence of operations including the formation by injection of a slug or parison of heat-plastified material on a hollow core in an injection mould, and the transfer of the core and slug to a blow mould where the bottle is produced by blowing compressed air through the core into the slug, whereby the latter is expanded and applied against the wall of the mould. More particularly the invention is concerned with those machines of the kind referred to, in which the injection of a fresh slug proceeds concurrently with the blowing of a slug injected in the last preceding cycle of operations.

It is an object of the invention to improve the machines of the kind referred to with a view to increasing the rate of delivery of finished bottles.

The invention consists of a machine for the manufacture of bottles from thermoplastic material by the concurrent injection of a slug of fresh material and the blowing of a slug formed in a preceding cycle of operations, wherein each cycle of operation comprises the following sequence of operations:

(a) While the moulds are closed: the formation of a fresh slug on a first core in an injection mould, the blowing in a blow mould of a slug formed on a second core during the preceding cycle, and the simultaneous stay of a third core at a station outside the moulds;

(b) While the moulds are open: the transfer of the first core from the injection mould to the blow mould, the transfer of the second core from the blow mould to the outside station, and the transfer of the third core from the outside station to the injection mould;

The slug during the transfer from the injection mould to the blow mould, and the bottle within the blow mould and outside the latter until its removal from the machine, being held by the neck in a neck mould surrounding a part of the coordinated core.

The machine makes it possible to take into consideration the fact that as a rule the neck of the bottle needs a longer time for cooling and solidifying than the remainder of the bottle. This allows the bottle to be withdrawn from the blow mould at a time when its body has solidified so much that it does not collapse or become otherwise deformed of its own accord when taken out of the mould, while the still more delicate and not yet fully solidified neck is still being held in the neck mould. The cooling of the bottle is completed outside the blow mould, either at the outside station aforesaid or already on the way to that station, and the bottle can be removed from the machine while two further bottles are being made in the two moulds. In this machine the blow mould is, therefore, vacated more rapidly than in hitherto known machines of this kind, and as the injection takes as a rule anyway less time than the processing of the slug in the blow mould, the transfer of fresh slugs to the blow mould and the delivery of ready-blown bottles can be quickened, which means a greater output of the machine than hitherto.

In special cases, where the neck takes a very much longer time to cool than the remainder of the bottle, the process may be modified by the addition of a further outside station and a fourth core. In that case, the blown bottle emerging from the blow mould is left on its core at the first outside station while a fresh injecting and blowing cycle is going on, while another bottle, produced one working cycle earlier, is at the second outside station or is being removed from the machine.

In its simplest form the machine includes a unit of three cores turnable about an axis in relation to which the cores are disposed radially with angles of 120° between them; an injection mould and a blow mould whose longitudinal axes include an angle of 120° and which are formed by registering depressions in two platens of which at least one is movable so that the platens can in alternation be closed in on, and be removed from, one another; a free space where one of the cores is accessible from outside while the other two are enclosed in the two moulds; means for shifting the core unit along its axis of rotation clear of the moulds when the platens are opened, means for turning the unit by 120° while the platens stay thus open; and a neck mould disposed round each core near the axis of rotation of the core unit.

In the special case that two outside stations are provided, the core unit will include four cores with angles of 90° between them, and the angle included by the longitudinal axes of the moulds as well as the angle by which the core unit turned each time the moulds are opened, will equally be 90°.

The core unit may comprise a hub turnable about and slidable along a fixed axle, and the latter may be secured to one of the platens, either the movable or the stationary one in case only one of them is movable.

An air conduit may also be disposed in this axle in such a manner as to communicate with the core for the time being to be found in the blow mould, and a suitable valve will be provided in order to let off the air pressure from the bottle blown in the blow mould when the blow mould is to be opened.

In a preferred embodiment of the invention, two sets of moulds and two core units are built together between the same two platens in such a manner that the injection moulds are placed bottom-to-bottom and a sprue bushing is located between the bottoms. In an embodiment of this kind it is also possible to provide common drive means for turning the two core units.

The removal of the ready bottles from the cooling stations may be effected by hand or in any other suitable way.

By a further feature of the invention, thermo-electric temperature checking means may be provided for each core, allowing the temperature of the core to be ascertained during the injection of the slug.

The neck moulds may be constituted in any suitable manner.

A bottle-making machine according to the invention is illustrated, by way of example only, in the accompanying drawings in which:

Figs. 2 and 3 are fragmentary elevations of the same bottle making machine in two different working positions;

Fig. 4 is a fragmentary side elevation, partly in section on line IV—IV of Fig. 1 through the upper part of the bottle making machine and the platens of the moulding machine;

Fig. 5 is a similar section of the lower part, in a different working position;

Fig. 6 is a fragmentary section, on a larger scale, on line VI—VI of Fig. 1;

Figure 1:
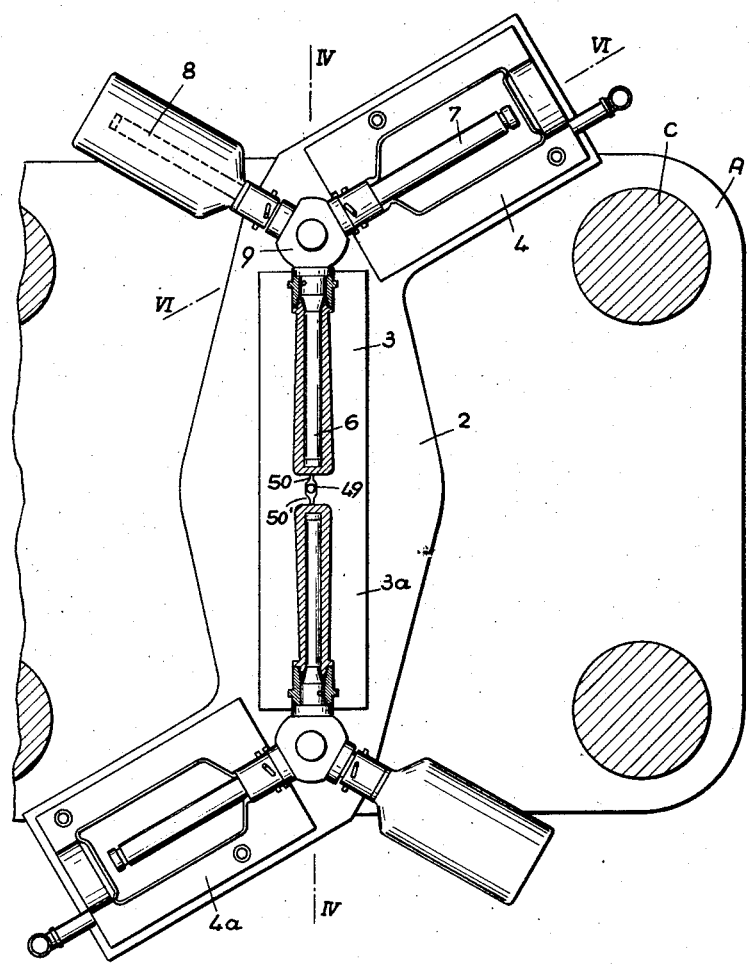
Fig. 1 is an elevation of the movable platen of an injection moulding machine fitted with a bottle making machine according to the invention.

In the example here illustrated the bottle making machine according to the invention is mounted on a conventional injection moulding machine which includes the movable platen A, fixed platen B, tie bars C and injection nozzle D.

The machine here illustrated by way of example is a twin machine including two complete sets of divided moulds and two core units for the simultaneous and parallel performance of two complete manufacturing cycles. Each set comprises an injection mould, a blow mould and an outside station. Each mould of either set is composed of two parts, one of them secured to the fixed platen B and the other to the movable platen A of the injection machine. The remaining working elements of the bottle making machine have been shown in this embodiment to be mounted on the movable platen, but this is an optional arrangement, and within the scope of this invention they may as well be mounted on the stationary platen. Moreover, while the platens are described as those of a conventional injection moulding machine, the nature of the moulding machine is not a feature of the present invention. The invention relates to the bottle making machine proper, no matter how and from what source it is supplied with heat-plastified thermo-plastic material.

One part of each mould of either set and the core units are carried by a mounting plate 2 which forms the cover of a box 1. The latter is secured to the movable platen A and encloses the principal drive and control members of the machine (Figs. 2 to 4). Bolted to the plate 2 is one half 3 of the injection mould and one half 4 of the blow mould of one set, and the corresponding parts 3a and 4a of the other set. The companion parts of the same moulds are bolted to a mounting plate 5 secured to the fixed platen B (Figs. 4, 6). The companion parts 3', 3a' and 4' are shown in Fig. 4, while the part corresponding to 4a has not been shown. As the two sets are identical but for the relative positions of the injection and blow moulds and outside station (Fig. 1), reference will be made hereafter to one set (the upper one of Fig. 1) only, except where it is necessary to distinguish between them. The longitudinal axes of the moulds 3 and 4 of the same set include an angle of 120°.

Figure 11:
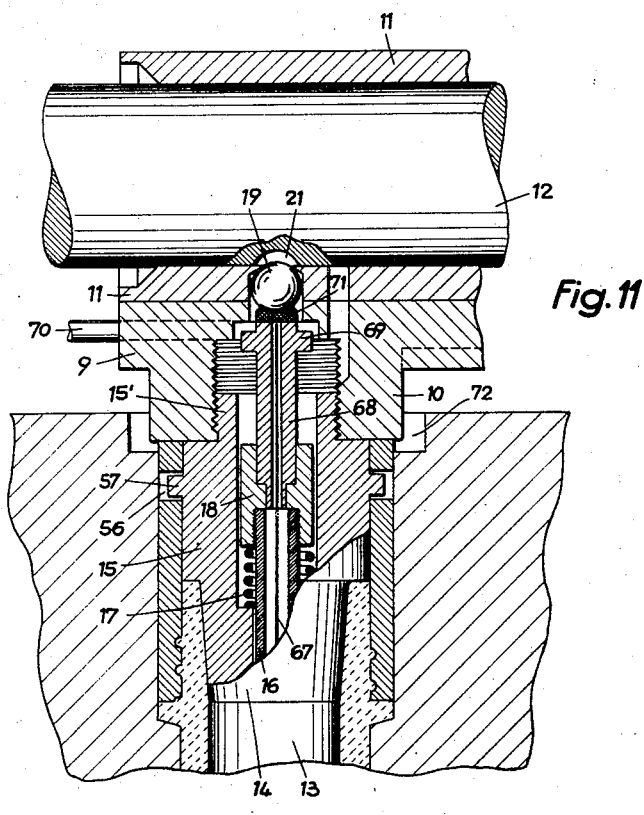
Fig. 11 shows a detail on a still larger scale.

A unit of three cores is co-ordinated to each set of moulds. In Fig. 1, core 6 is in the injection mould, core 7 in the blow mould, and core 8 in the outside station, and a ready bottle is still carried by the core 8. The cores are fixed in radial positions, with angles of 120° between them, to a hub 9 which is provided for this purpose with three internally threaded sockets 10 (Figs. 6, 11). The hub is internally lined with a precision-ground bush 11 which turns freely on a stationary axle pin 12 and is also axially displaceable relative thereto.

Each core includes a tube 13 (Fig. 6) which merges at its inner end into a tapered section 14. The latter in turn merges into a head 15 provided with an externally threaded boss 15' screwed into the socket 10 (Fig. 11). A thin tubular rod 16 extends through the entire length of the tube 13. At its outer end the rod 16 carries a valve constituted by a disc 13' (Fig. 6) designed to seal the outer end of tube 13 when the tube 16 is in a retracted position relative to tube 13, e. g. in the injection mould (Fig. 4), or to give the end of tube 13 free when the tube 16 is forced outwards, e. g. in the blow mould (Figs. 1 and 6). The tube 16 is urged inwards relative to tube 13; i. e. towards the axle 12, by a compression spring 17 (Fig. 11) which bears against a shoulder within the tapered section 14 on the one hand, and on the other hand against a head 18 screwed on the tube 16. Against the action of spring 17 the tube 16 is forced outwards in certain angular positions of the core by a ball 19 which is lodged in a recess of the bush 11 and bears against the axle 12. The latter is flattened or recessed in certain parts 21 along the path of the ball, and when the core occupies an angular position in which the ball bears against such recessed or flattened portions 21, the tube 16 yields to the pressure of spring 17 whereby the tube 16 is retracted and the disc 13' made to seal the tube 13. When the ball rides on a not-recessed portion of the axle 12, the ball and consequently the tube 16 is pressed outwards against the action of spring 17 whereby the disc 13' is removed from the end of tube 13, and a gap 20 is opened between the end of tube 13 and the disc 13' (Fig. 6).

The hub 9 is surrounded by a sleeve 22 (Fig. 6) and connected to the latter by keys 23 (Figs. 2, 3) allowing the sliding displacement of the hub relative to the sleeve 22 in axial direction, but no relative angular movement. The sleeve 22 has a terminal flange with inwards turned rim 22'. A ring 24 whose design and purpose will be described below, is secured to the sleeve 22, while a toothed crown 25 is rotatably mounted on the sleeve 22 in free-wheel connection so that the crown, when turning in one direction (anti-clockwise in Figs. 2 and 3) takes the sleeve with it, but is disconnected from the sleeve when it rotates in the opposite direction. The connection between the crown 25 and ring 24 is established by a pawl 26 pivotally mounted at 27 on the ring 24 and urged by a spring 28 into engagement with notches 29 of the toothed crown.

A compression spring 30 (Fig. 6) is helically wound on the axle 12 between the rim 22' of the sleeve 22 and the near end of the bush 11, tending to push the latter away from the movable platen A in the direction towards the platen B.

The free end of the axle 12 opposite the movable platen A bears a detachable knob 12' (Fig. 6) which serves as an abutment for the bush 11 in the most extended state of the spring 30 (Fig. 5). This is the position of the hub when the moulds are fully open. When the moulds are closed (Figs. 4, 6) the knob 12' is lodged in a recess 5a of the mounting plate 5, and the bush 11 is shoved towards the platen A against the action of spring 30, owing to some part of the hub 9 or of the cores abutting against some part mounted on the fixed platen. For example, as shown in Figs. 4 and 6, the neck moulds of the cores for the time being in the injection and blow moulds may abut against the parts of these moulds fixed to the platen B.

The shifting of the cores round the axle 12 is achieved by the co-operation of the toothed crown 25 with a rack 31 (Figs. 2, 3). The rack is secured to the head 39 of the rod 34 of a piston 33 reciprocable in a cylinder 32 through whose head 35 the rod 34 passes. The piston is tightened against the cylinder by a washer 36. Compressed air is supplied to the cylinder through a connection 37 and can be blown off when the pressure in the cylinder is to be released. A compression spring 38 is coiled round the piston rod outside the cylinder. It bears at one end against some fixed part, and at the other end against the head 39. This spring acts in opposition to the air pressure on the piston in the cylinder. When the air-pressure is received, the rack is urged by spring 38 into its lowermost position, but when compressed air is admitted into the cylinder, the piston is shifted upwards and the rack makes the toothed crown 25 turn in anti-clockwise direction in which, as stated above, it takes the ring 24 with it. The end of this movement is reached when it corresponds to an angular movement of the toothed crown through 120°. A shoe 40 provided at the lower end of the rack then strikes a detent 41 pivotally mounted at 42 in a fixed part, e. g. the mounting plate 2. The detent is thereby made to engage one of three notches 43 provided in the ring 24.

Thereby the upward movement of the rack as well as the rotation of the ring, and accordingly of the sleeve 22, hub 9 and the core unit, are immediately arrested in the exact position required. A further safety means against inexact angular adjustment of the hub and core unit is provided by the following arrangement:

The ring 24 has three radial threaded bores 44 for bolting the ring to the sleeve 22. In the correct angular position of the ring in which the apparatus can be operated, one such bore faces the rounded head 45 of a pin 46 slidably disposed in a bore of a suitable fixed part, and in this position the head 45 is held engaged in the bore 44 by the action of a compression spring (not shown). When no such bore faces the head 45, i. e. while the ring 24 turns, or when the ring 24 has been arrested not in the exact angular position required, the pin 46 is pushed back and strikes another pin 47 which is thereby made to interrupt an electric contact 48. The latter forms part of an electric control circuit, for example, a relay circuit so connected to the drive motor of the moulding machine that the moulds can not be closed as long as the contact 48 is interrupted.

In the embodiment of the invention here illustrated, the rack 31 operates the core unit of the lower set of moulds. To the same piston 33 another rack (not shown) is fixed for operating the core unit of the upper set. One and the same stroke of the piston 33 moves both racks in the same direction, and the core units of both sets, therefore, turn in the same sense, i. e. anti-clockwise as seen in Figs. 1 to 3. Now, the injection moulds of both sets are disposed in bottom-to-bottom relation (Fig. 1), and as from either injection mould the core has to be transferred to the blow mould of the same set, the blow mould of the upper set has to be disposed to the right of the upper injection mould, and the blow mould of the lower set to the left of the lower injection mould.

The arrangement of the two injection moulds in bottom-to-bottom relation makes possible the simultaneous supply to both injection moulds of heat-plastified thermoplastic material from the injection nozzle D through a common sprue bushing 49 and individual short gates 50, 50' (Fig. 1). In conjunction therewith, a sprue extractor (Figs. 4, 5) is provided which enters into action when the moulds are being opened. This consists mainly in a pin 51 with head 52, slidable in corresponding bores of the casing 1 and mounting plate 2 and urged by a compression spring 53 into a retracted position. At the end of the injection operation the sprue is filled with a plug of gradually solidifying thermoplastic material in which the head 52 becomes embedded, and as the movable platen A is moved away from the fixed platen B, the extractor takes the plug with it. At a given moment the end of the pin 51 strikes an appropriate abutment 51a (Fig. 5), and by the ensuing forward movement of the pin the sprue plug is made accessible and can be stripped by any suitable means.

The head 15 of each core is designed to carry an annular or sleeve-like neck mould 54 (Figs. 7 to 10) which is made in one piece and engraved on its inner face with the negative 55 of the thread to be formed on the neck of the bottle. The neck mould has oblique slots 56 engaged by pins 57 projecting from the core head 15. When the neck mould is turned round the core as far as the slots allow, it carries out a screwing movement.

A nipple 58 (Fig. 6), which is connected to a supply of compressed air, communicates with bores 59, 60 provided in the axle 12 in such a position that the bore 60 opens through registering bores 61, 62 of the bush 11 and hub 9 into the core 7 for the time being in the blow mould. In all other positions the cores are shut off from the compressed-air supply by displacement of the bores 61, 62 relative to the bore 60. However, if it is desired to provide a temporary state of air pressure also in another position of the cores, e. g. in the outside station with a view to facilitating the discharge of the finished bottle, similar bores may be disposed in the axle in such other position as well. By means of a control valve provided in the air supply line that is connected to the nipple 58, the flow of air is altogether disconnected automatically all the time the mould is not fully closed. Therefore, when the air supply is connected the compressed air flows into the socket 10 and thence further through the core and the gap 20 into the interior of the bottle that is being formed. Ducts 72 are provided for relieving the air pressure when the core valve 13' is shut. When the air supply is disconnected, normal pressure prevails within the core and the bottle being formed or already formed.

Channels 63 (Fig. 6) are provided in the blow mould and connected to inlet and outlet nipples 64, 65, in order to enable the circulation of a coolant through this mould, if this is desired. The cavity of the blow mould has the shape that it is intended to give to the bottle to be made, and a bottom block 66 may be provided in order to form in the bottom of the bottle the inward bulge that is usually made therein.

The bottle making machine described hereinbefore works as follows:

Fig. 1 shows the machine at the end of a working cycle which must be at least the third cycle after starting the operation of the machine. At the end of this cycle a fresh slug of heat-plastified material has been injected into the injection mould 3, a previously formed slug has been expanded by blowing in the blow mould 4, and a ready bottle, formed from a slug injected at a yet earlier cycle, is ready for discharge in the outside station where only its neck is still held in the neck mould 54. This bottle is now being discharged by an unscrewing movement. The unscrewing can be done by hand or by means of a suitable automatic mechanism.

The next step consists in opening the moulds. The movable platen A is drawn away from the fixed platen B. During this movement the compression spring 30 shifts the bush 11, hub 9 and core unit to the right until the bush 11 abuts against the knob 12'. The cores, and the slug and bottle formed thereon, now stay clear of the moulds. This is the position illustrated in Fig. 5 for the lower set. As soon as this movement has been completed, the rack mechanism enters into action and turns both core units through 120° about the respective axles 12. By this latter operation, of which Fig. 2 shows an intermediate state, the core previously enclosed in the injection mould, with the fresh slug formed thereon, is brought into register with the blow mould, the core previously enclosed in the blow mould is brought into register with the outside station with the ready bottle on it, and the core previously to be found in the outside station, from which the bottle has just been discharged, returns empty into a position in register with the injection mould.

After the completion of this motion, the movable platen A closes in on the fixed platen. As this movement proceeds the neck moulds abut against the inner faces of the mould halves on the fixed platen and the core units are pressed back, against the action of spring 30, until they have returned into the position shown in Fig. 4 when the moulds are fully closed. Then a new cycle of injection and concurrent blowing is started, and so on.

If the time required for the slug to be blown and for the bottle to cool in the blow mould so as to become sufficiently stable, is longer than the time required for the injection of a fresh slug in the injection mould, the injection should be started so much later than the blowing operation that the fresh slug and the blown bottle are ready for transfer substantially at the same time. This time lag may be of the order of, say 3 to 8 seconds, depending on the kind of material, the wall strength of the bottle to be made, and other circumstances of the particular case.

The neck is formed already in the injection mould as the freshly injected thermoplastic material enters the space defined by the neck mould and the parts of the core within the neck mould, and this portion of thermoplastic material is not affected by the subsequent steps of the cycle. However, while allowed to cool in the neck mould the neck undergoes some shrinkage which, unless compensated, would make the removal of the bottle difficult, and would also make the thread rough and lacking in precision. In order to eliminate these drawbacks and to compensate the shrinkage, the annular neck mould is turned round the core from the position of Figs. 7 and 8 into that of Figs. 9 and 10 immediately before the bottle is discharged. As the bottle, once emerged from the blow mould, is not held or confined by any part other than the neck, the contraction of the neck does not put any strain on the neck or its thread. The bottle can therefore be removed from the neck mould by a simple and easy unscrewing movement and the thread is obtained with the exact gauge as the shrinkage can be calculated beforehand to a fraction of a millimeter.

This has a twofold advantage: first, the neck thread can be designed to fit any standard thread gauge of closure caps commercially available, and by simply exchanging the neck mould, one and the same type and size of bottle can be delivered from the same injection and blow moulds with different necks to match any desired cap design and gauge. Secondly, the neck mould according to the invention allows the manufacture of necks so thin that in contrast to conventional bottles made by similar processes which produce quite stiff necks, the neck can retain a certain resilience. This, in conjunction with the very precise circular shape of the neck obtained by the annular mould according to the invention in contrast to the always irregular shape obtainable with conventional split neck moulds, enables the use of the edge of the neck as a gasket by simply screwing it tightly against the bottom of the cap. In this manner the soft liner which is usually inserted in the cap for tightening the closure and which increases the cost of the cap considerably, may be dispensed with.

Figure 7:
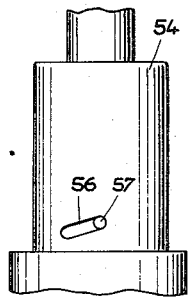
Figs. 7 to 10 show on an enlarged scale a neck mould in elevation and axial section in two different working positions.
Figure 8:
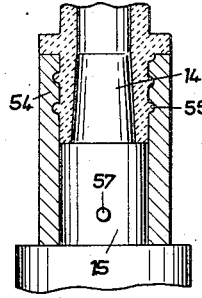
Figure 9:
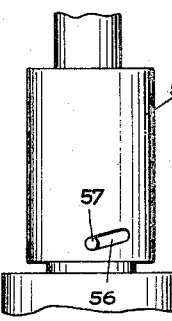
Figure 10:
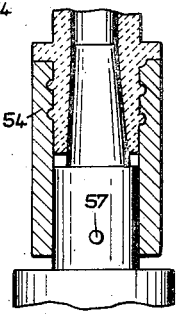

When the empty core returns from the outside station to the injection mould, the neck mould is turned back into the position of Figs. 7 and 8. This may be done in any suitable way, e. g. by the pressure exerted by the freshly injected thermoplastic material.

In manufacturing the bottles it is desirable to keep a check on the temperature of the cores as these tend to overheat. This is done, in accordance with the present invention, by the following simple arrangement: a wire 67 (Fig. 11) of a steel-nickel alloy, preferably constantan, is stretched the whole length of tube 16 in the interior thereof and welded at one end to the sealing disc 13', and at the other end to a part 68 disposed on the top of tube 16 and made, for example, of copper, silver or platinum. This part has a collar 69 adapted to make electric connection with a terminal pin 70. The ball 19 is in this case electrically insulated from the part 68 by an interposed layer 71 of insulating material. This device constitutes a thermo-couple, and the temperature prevailing in the core can be read on an appropriate instrument connected to the terminal 70. Of course, this can be done only when contact exists between the collar 69 and terminal pin 70, that is, in the retracted position of tube 16.

It will be understood that many modifications of the machine described are possible within the scope of the invention. For example, the rack operating the two core units may be driven hydraulically, mechanically or electromagnetically instead of pneumatically. The two core units may have independent drives whose operation will be timed to exact simultaneity. The machine may be confined to one single set of moulds and cores, or, conversely, it may comprise more than two sets. The term "bottle" used in this specification includes hollow vessels of any description as far as they have a neck.

What I claim is:

1. A machine for the manufacture of hollow articles from thermoplastic material, including a core unit of at least three cores turnable about an axis in relation to which the cores are disposed radially with equal angles between them, a mold unit consisting of two platens positioned to close about an adjacent two of said cores, said platens defining an injection mold and a blow mold disposed with the same angle between said molds as the angle between any two adjacent cores whereby two adjacent cores are within said molds when the platens are closed, said platens also being shaped to define an open space whereby the remaining cores are outside the mold unit when the platens are closed, means to open and close the platens about the core unit, means for shifting the core unit longitudinally relative to its axis of rotation to a position intermediate of the molds when the platens are opened, and means for rotating the core unit by an angle equal to the angle between adjacent cores each time the platens are opened.

2. A machine as claimed in claim 1, including three cores with angles of 120° between them.

References Cited in the file of this patent

UNITED STATES PATENTS

| | | |
|---|---|---|
| 2,315,478 | Parkhurst | Mar. 30, 1943 |
| 2,331,702 | Hopitke | Oct. 12, 1943 |
| 2,353,825 | Hofmann | July 18, 1944 |
| 2,515,093 | Mills | July 11, 1950 |
| 2,715,751 | Weber | Aug. 23, 1955 |

FOREIGN PATENTS

| | | |
|---|---|---|
| 489,022 | Italy | Jan. 13, 1954 |
| 1,091,090 | France | Oct. 27, 1954 |
| 165,061 | Australia | Sept. 7, 1955 |
| 1,114,897 | France | Dec. 26, 1955 |

OTHER REFERENCES

"Blow-Molding of Polythene Bottles," in British Plastics, vol. 26 No. 293, pages 357 to 360, October 1953, published by Iliffe and Sons, Ltd., Dorset House, London, England.